Oct. 31, 1961  I. SPIAZZI  3,006,458
SYSTEM FOR THE FEEDING OF PLATES IN
ADDRESS-PRINTING MACHINES
Filed July 7, 1958  2 Sheets-Sheet 1
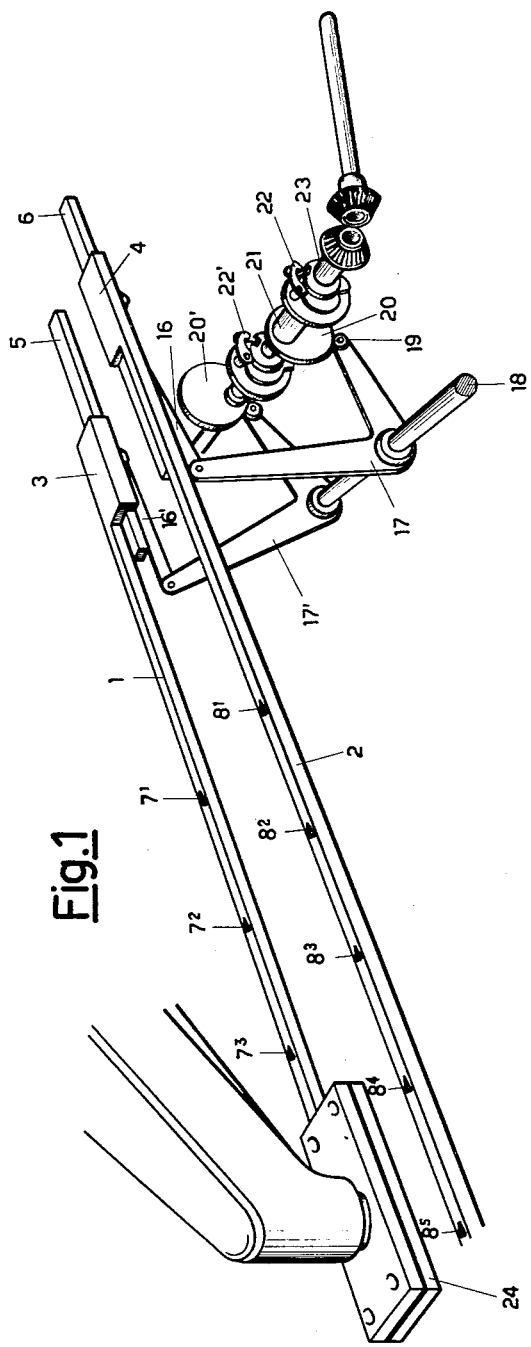
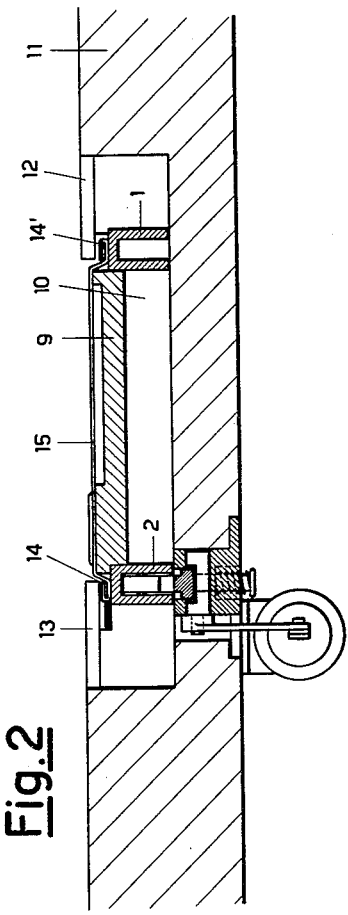
Inventor:
Ivo Spiazzi
By: [signature]
Attorney

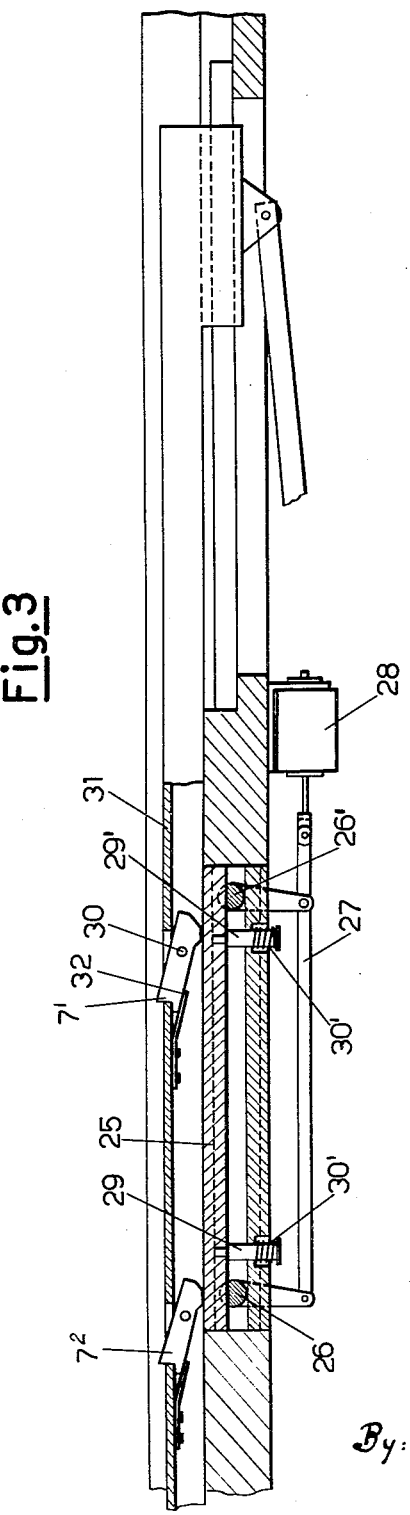

3,006,458
SYSTEM FOR THE FEEDING OF PLATES IN ADDRESS-PRINTING MACHINES

Ivo Spiazzi, Milan, Italy, assignor to Fabbrica Italiana Macchine Aziendali, Milan, Italy, a company of Italy
Filed July 7, 1958, Ser. No. 746,905
Claims priority, application Italy July 24, 1957
4 Claims. (Cl. 198—221)

With conventional addressing-machines the feeding of the plates is determined by a slide that takes the last plate from a series loaded in a loading magazine and by an extractor, connected to said slide, which by means of small teeth determines the feeding towards the subsequent positions into which said plates are to be taken.

Sometimes, if one side of the plate taken from the loading magazine is pressed by the slide, the latter pushes also all the successive plates which are at contact with one another and compelled to follow a determined path. In that case the extractor with its small teeth serves to discharge the machine when plates become lacking in the loading magazine and, therefore, the slide cannot determine the feed.

In both cases the system that determines the feed of the plates follows an alternating cycle whence a feed stage is followed by a phase of return to the original or zero position.

The feed may last longer than the idle return in order not to impart to the series of plates—at equal number of feeds in the unit of time—an excessive feed speed; in any case however there exists an interval of time in which the feed system returns to zero and in which, therefore, the plates are at a standstill. The stopping of the plates normally lasts longer than the interval useful for other functions, such as for instance printing.

It is a main object of the invention to reduce the stopping interval of the plates to the length of time strictly necessary for the accomplishment of other tasks of the machine without binding said interval of time of the return to zero of the feed control system.

This, as will be made fully clear in the following description, is obtained by constituting two plate-feed control systems, whence while one is in action, the other one returns to zero and vice versa.

In that way, at equal plate-feeding speeds, it is possible to attain much higher feeding speeds.

A further object attainable by said system is to cause feeds from a certain station on, while the feeding from the loading magazine to said station is interrupted; in that way there are created empty spaces within the series of plates present in the race, which may serve for particular purposes.

The whole will appear more clearly from the following description with reference to the embodiment illustrated, by way of example, in the drawings in which:

FIG. 1 represents the diagrammatical assembly of the extractors;

FIG. 2 represents a cross-section of the feed mechanism; and

FIG. 3 represents the feed system for the plates in one position.

In FIG. 1 there are visible two feed rods 1 and 2 each connected to its own slide 3 and 4 respectively guided by sliding blocks 5 and 6.

Each feed rod, which hereinafter will be called an extractor, is made in U-shape in which there are fulcrumed small teeth for the feeding of the plates $7^1, 7^2, 7^3 \ldots 7^n$ on the rear extractor and $8^1, 8^2, 8^3 \ldots 8^n$ for the front extractor.

The number of small teeth will depend on the number of the stations, or positions of the plates, with which the machine is provided.

According to FIG. 2, the extractors slide laterally of a member 9 for guiding the plates.

Extractors and a central guide member are housed in a recess 10 provided in bed 11 of the machine.

Above the borders 14 and 14' of the plates 15 there are provided guides 12 and 13 in such a way that the plates 15, pushed by the small teeth 7 and 8 of the extractors 1 and 2, are completely guided by the central member 9 and by the guides 12 and 13 hereinbefore mentioned.

The slides 3 and 4, whose task well-known in this art is to extract the plates from the loading magazine, are controlled respectively by the rod 16, by the crank lever 17 fulcrumed in the shaft 18, and controlled by means of a small roller 19 which engages the cam 20. The cam 20 is fitted onto a sleeve 21 and is driven by a drive shaft 23 through a coupling 22.

For the slide 3 we shall have analogously a rod 16', a lever 17', a cam 20' and a coupling 22'.

Assuming that couplings 22 and 22' are both engaged, the different phasing of the came 20 and 20' causes the extractor 2 and with it all the plates present in the machine, to be fed forward, while the extractor 1 performs the idle (empty) stroke of returning to zero; inversely, while the extractor 1 and with it all the plates present in the machine, are fed forward, the extractor 2 performs the idle (empty) stroke of returning to zero. In that way there is not the necessity of a quick return of the extractor to the zero position, since this is not lost time; and there is not the problem of increasing the number of revolutions of the drive shaft 23 to increase the number of feeds in any unit of time, since by the present system there is already obtained a double number of feeds at equal number of revolutions of the shaft 23. The increase of the number of revolutions of the drive shaft involves in fact an increase of the linear feeding speed of the plates with all the problems connected with the frictional forces between the plates and guides and with the difficulty of stopping said plates in an accurate position.

The profile of the cams then may be such as not to involve the feeding of the extractors and, therefore, of the plates, in a certain interval of time in which for instance the pressure member 24 is in contact with the sheet to be printed. Under the member 24 there will be provided an inking tape, and the plate 15. This structure is well-known in the art.

It is possible with the present system to free certain stations from plates, for instance after the station in which, by means of the pressure member 24, the printing is obtained. Referring to FIG. 3 a movable member 25 is provided which is engaged by the extensions of the small feed teeth $7^1$ and $7^2$ in the example. On lifting said member the small teeth rotating about their own supporting pins 30, will no longer determine the feed since their tips will lie below the surface 31 of the extractors. A system for accomplishing this may be by controlling rotation of the cam shafts 26 and 26' by means of a link 27 and solenoid 28; the member 25 tends to return to the lowered position (wherein the teeth are in a position to feed the plates) by means of the pins 29 and 29' between which and the bench of the printing machine there act return springs 30'. The small teeth for feeding then tend to be maintained in the active position by small springs 32.

The system of inactivation of the feed described with regard to an extractor may obviously be applied to both extractors. Said inactivation may be more or less cyclical according to the necessities of the problem.

I claim:
1. A plate feeding mechanism for an address printing machine comprising a pair of elongated feed bars spaced laterally from and parallel to one another to support the plates to be fed, said feed bars being mounted to reciprocate longitudinally to and fro in forward and reverse directions, means on both feed bars to engage respective plates to move each plate forward during forward movement of one of said feed bars, and means for moving one of said feed bars in a forward direction while simultaneously moving said other feed bar in a reverse direction, said feed bar moving means comprising a pair of coaxially mounted substantially identical cams, said cams being angularly spaced from one another and in phase opposition, means connecting one of said cams to one of said feed bars to reciprocate said one feed bar and identical means connecting the other of said cams to the other of said feed bars to reciprocate said other feed bar, and means for driving both said cams simultaneously to thereby intermittently reciprocate each of said feed bars in opposite directions simultaneously.

2. A plate feeding mechanism for an address printing machine, comprising a pair of elongated feed bars spaced laterally from and parallel to one another to support the plates to be fed, said feed bars being mounted to reciprocate longitudinally to and fro in forward and reverse directions, a plurality of abutments positioned in longitudinally spaced relation along each of said bars, each of said abutments being positioned to engage and effect forward movement of a plate when a respective bar is moved forwardly, the two bars operating alternately to cause their abutments to effect such forward movement, a pair of identical bell crank levers pivotally mounted beneath said feed bars on a common axis, means connecting one arm of each lever to a respective feed bar, a shaft, a first cam mounted on said shaft in engagement with the other arm of one of said bell crank levers, a second cam identical to said first cam and being mounted on said shaft in engagement with the other arm of the other of said bell crank levers, said cams being in phase opposition to one another, and means for rotating said shaft to cause said cams to move one of said bars in a forward direction while simultaneously moving the other of said bars in a reverse direction.

3. A plate feeding mechanism for an address printing machine, comprising a pair of elongated feed bars spaced laterally from and parallel to one another to support the plates to be fed, said feed bars being mounted to reciprocate longitudinally to and fro in forward and reverse directions, a plurality of abutments positioned in longitudinal spaced relation along each of said bars, each of said abutments on each of said bars being operable to engage a plate positioned across said bars behind the rear edge of said plate to move said plate forwardly during movement of one bar forwardly, the two bars operating alternately to cause their abutments to effect such forward movement, a pair of identical bell crank levers pivotally mounted beneath said feed bars, means connecting one arm of each lever to a respective feed bar, a cam shaft, a first cam rotatably mounted on said cam shaft in engagement with the other arm of one of said bell crank levers, a second cam identical to said first cam and rotatably mounted on said cam shaft in engagement with the other arm of the other of said bell crank levers, means for rotating said cam shaft, a first coupling means disengageably connecting said first cam to said cam shaft to rotate with said cam shaft, and a second coupling means disengageably connecting said second cam to said cam shaft to rotate with said cam shaft, said cams being in phase opposition to one another, when both cams are connected to said cam shaft by their respective coupling means, to pivot said bell crank levers to move one of said feed bars forwardly while simultaneously moving the other of said feed bars rearwardly.

4. In a plate feeding mechanism for an address printing machine having a pair of elongated feed bars spaced laterally of and parallel to one another to support on the top faces thereof the plates to be fed, said feed bars being mounted to move relative to one another and to reciprocate longitudinally in forward and reverse directions, a plurality of longitudinally spaced abutments along at least one of said bars, said abutments being pivotally mounted intermediate their ends on said one bar and having one end projecting above the top face of said bar and the end opposite said one end projecting below the bottom face of said bar when in one pivotal position, said one end being below the top face of said bar in another pivotal position, a member disposed beneath said bar and spaced from the bottom face thereof, and means connected to said member for moving said member upwards toward the bottom face of said feed bar to engage with said opposite ends of said abutments to pivot said one end of each of said abutments to a position wholly beneath the top face of said feed bar.

References Cited in the file of this patent
UNITED STATES PATENTS

| | | |
|---|---|---|
| 1,686,696 | Hirschmann | Oct. 9, 1928 |
| 2,451,213 | Gollwitzer | Oct. 12, 1948 |
| 2,677,543 | Ohrn | May 4, 1954 |